Figure 4:
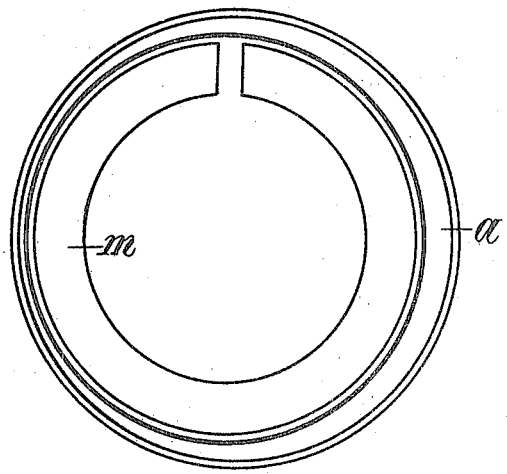

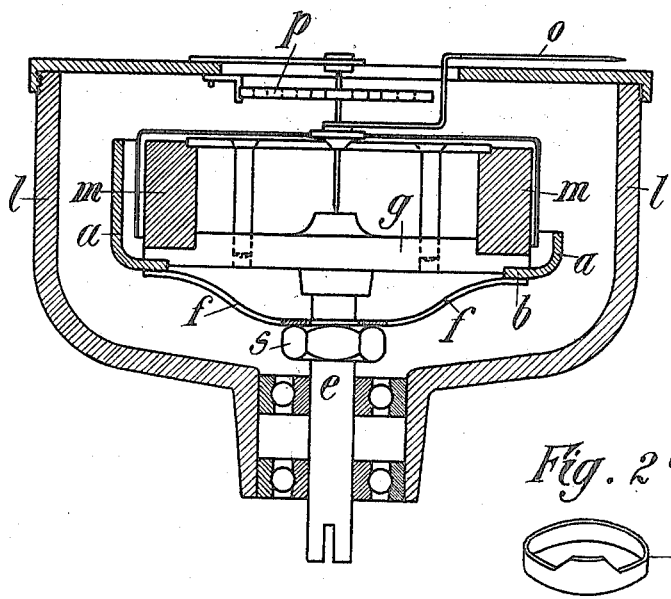
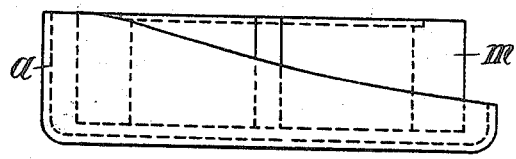
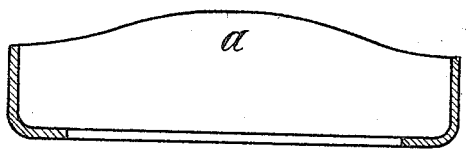

W. BECKMANN.
EDDY CURRENT TACHOMETER.
APPLICATION FILED MAR. 31, 1914.

1,202,777.

Patented Oct. 31, 1916.

2 SHEETS—SHEET 2.

Witnesses:
E. G. McGee
G. Tate

Wilhelm Beckmann,
Inventor.
Emil Börnelycke,
Attorney.

UNITED STATES PATENT OFFICE.

WILHELM BECKMANN, OF BERLIN, GERMANY.

EDDY-CURRENT TACHOMETER.

1,202,777.　　　　Specification of Letters Patent.　Patented Oct. 31, 1916.

Application filed March 31, 1914. Serial No. 828,607.

*To all whom it may concern:*

Be it known that I, WILHELM BECKMANN, engineer, subject of the King of Prussia, residing at 5 Fontanepromenade, Berlin, S., 59, Germany, have invented certain new and useful Improvements in Eddy-Current Tachometers, of which the following is a specification.

The present invention relates to an eddy-current tachometer with iron return path body, revolving together with the revolving magnetic system.

The action of eddy-current tachometers depends on the principle that by means of a magnet revolving at the speed to be measured an indicator body is forced contrary to the action of a spring by the eddy-currents produced. The stroke of the said indicator body serves as the means for gaging the speed to be measured. For increasing the magnetic effect an iron return path body is generally arranged on the side of the indicator body which is opposite to the magnet, the said iron return path body being arranged to revolve with the magnet. By varying the position of this iron return path body it is possible to vary the torque produced by the permanent magnet and thereby also the stroke of the indicator. The means which have, heretofore, been employed for this purpose were based either on the position of the iron return path body relatively to the magnet being varied by screw-adjustment, or on the said body being in itself subjected to a variation, without its relative position to the magnet undergoing any change, so as to intensify or reduce the field of the lines of force according to requirement. So, for example, with a bell-shaped magnet the iron return path body is introduced more or less deeply into or over the said magnet, or the said iron return path body is formed of two soft iron sleeves provided with small windows and rotatable relatively to each other. With this latter form the field is varied correspondingly to the relative registering of the said windows in the two sleeves without the iron return path body as such being varied in its relative position to the magnet. These known constructional forms, however, show considerable disadvantages, as their construction is comparatively difficult and rather expensive. These disadvantages are obviated by means of the present invention. According to the present invention only a part of a revolution is sufficient for obtaining a perfect adjustment.

The present invention consists in giving an intrinsically non-variable iron return path body a special shape, so that when it is turned around the axis of the magnet the mass of iron opposite to the magnetic poles is either increased or reduced, or, on being turned, varying its relative position to the magnetic poles in such a manner that the field transecting the indicator body is increased or reduced. In both instances an axial displacement of the iron return path body, as caused by a screw-adjustment of the same in the known constructional forms, or a variation of the iron return path body itself is avoided.

In the accompanying drawing several embodiments of the present invention are exemplified.

Figure 6:
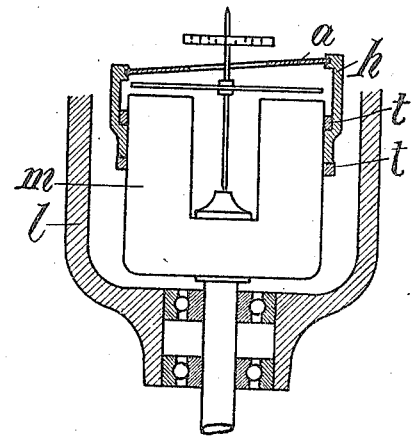
Figure 5:
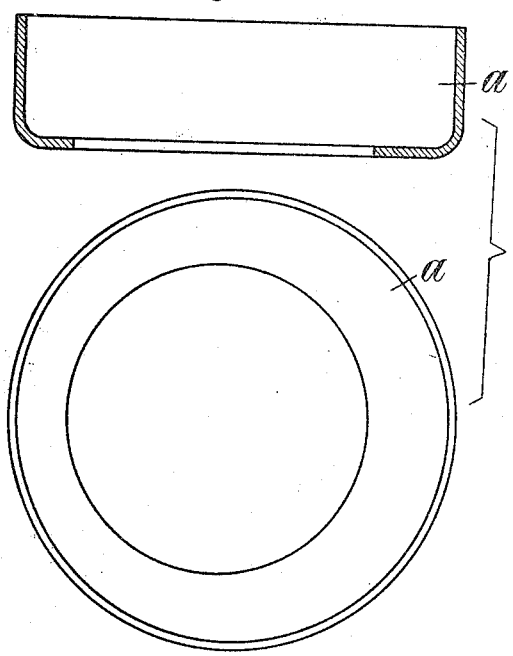
Figure 7:
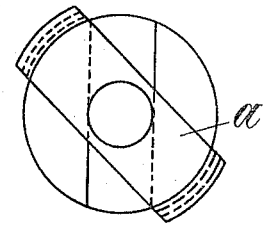
Figure 8:
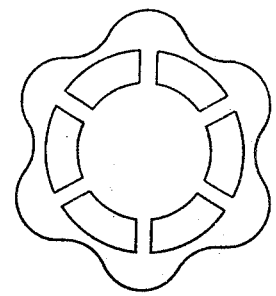

Figure 1 is a section through a tachometer with a ring-shaped magnet. Fig. 2 is an elevation of the magnet with the iron return path body. Fig. $2^a$ shows a modified form of the iron return path body. Fig. 3 is an axial section through the iron return path body alone. Fig. 4 is a plan of a ring-shaped magnet with an eccentrically disposed iron return path body. Fig. 5 is a section and plan respectively of the iron return path body according to Fig. 4. Fig. 6 is an elevation, partly in section through a tachometer with cylindrical magnets and the iron return path body arranged obliquely to the face end of the magnet. Fig. 7 is a two-pole cylindrical magnet in plan view with the iron return path body in form of a bridge parallel to the face ends of the magnet. Fig. 8 is a plan of a six-pole magnet with a corresponding iron return path body.

In the figures the letter $a$ indicates the iron return path body, which, in the constructional form according to Figs. 1–3 is of a cylindrical shape. Its wall, however, is made of a height varying at different points, the contour of the upper edge being, as shown in Figs. 2 and 3, inclined toward the plane of the lower edge of the cylinder. The cylinder is thus cut at an oblique plane. The field transsecting the indicator body is strongest when the highest part of the wall of the iron return path body is opposite to the poles of the magnet. When the said iron return path body is turned from such position, the field is weakened and with it the torque, the minimum being reached when the lowest part of the said wall is opposite to the poles of the magnet. Instead of the height of the wall changing in the described constant or regular manner, the height of the said wall may be varied in an irregular or inconstant manner, as exemplified in Fig. 2ª (a projecting corner being provided). The manufacture of the iron return path body is particularly favorable according to Fig. 1. The said body consists of a piece of sheet iron which is stamped and pressed from a plate into the form of a cylinder. The inner bore and the outer surface of the stamped out plate will then be circles which are eccentric to each other. When the said plate is pressed into its definite shape the inside bore becomes concentric to the wall of the cylinder. The thus formed iron return path body is now guided in a corresponding groove $b$ in the holding plate $g$ of the rotary magnet $n$ so that it may be easily turned therein. It is further held by means of a strap or ring $f$, which is preferably made elastic. By tightening the nut $s$, which is screwed on the axis of the magnet $e$, the iron return path body is securely held in position, so that it cannot change its position while the tachometer is working. The elasticity of the strap $f$ furthermore affords a safety lock for the fixing screw $s$.

$l$ is the casing, $o$ is the indicator and $p$ is the spring of the tachometer, which spring is secured at one end to the spindle of the indicator, and at its other end to the casing.

In the constructional form described the cylindrical wall of the iron return path body is disposed concentrically to the magnet and the indicator body, while the wall varies in height at the different points. In the second constructional form exemplified in Figs. 4 and 5 of the accompanying drawings the iron return path body is made of a cylindrical shape with an even height of the cylindrical wall. This cylindrical wall is, however, eccentrically arranged around the magnet system. By turning the iron path return body around the axis of the magnet the mass of iron opposite to the magnet poles can be approached to the latter or removed farther therefrom, whereby a correspondingly larger or shorter stroke of the indicator is obtained. The manufacture and the fitting of such iron return path body can be carried out in a corresponding and equally cheap manner as with the first described constructional form.

With both the embodiments described it has been assumed that the magnet is of a ring-shape. However, a magnet of a different shape may also be used. When the magnet has more than two poles, the iron return path body must be made accordingly. If, in the first described embodiment, according to Fig. 1, the magnet had more than two poles, it would have been necessary to provide in the wall of the cylinder one raised and one recessed part for each pair of poles, or, according to Fig. 8 the wall of the iron return path body may be made of an undulating shape corresponding to the pole pairs of the magnet system, so that parts of the iron return path body are close to the magnet system and other parts again are at a greater distance therefrom. When the iron return path body is made in form of a disk, the periphery of the disk is made of a form which also insures the same effect.

With the constructional forms described hereinbefore the indicator body incloses the magnet from outside. The same effect may, however, also be secured, if the bell-shaped indicator body is inclosed by the magnet. The adjustment is, however, not so advantageous, as the iron return path body is not as readily accessible from outside.

The present invention may also be employed with eddy-current tachometers in which a disk-shaped indicator body is used, for example of the kind shown in Fig. 6. Also here the iron return path body may be made either of a special shape or arranged in a special position, so that by its being turned, the torque is increased. So, for example, the iron return path body according to Fig. 6 is fitted obliquely to the face plane of the poles of the magnet and to the plane of the indicator body in a revoluble holding ring $h$. Said holding ring $h$ is guided in a groove formed of upper and lower rings $t$ which are secured to the outer surface of the magnet $m$, thereby permitting the necessary rotary adjustment of the body $a$. It is obvious that also here the turning of the iron return path body or of the holding ring respectively around the axis of the magnet will result in a displacement of the field and thereby in a varying of the torque. In an eddy-current tachometer of this kind, however, the iron return path body may also be disposed parallel to the plane of the poles of the magnet and the indicator body. It must then, however, be made of a different shape, for example, in form of a bridge, as shown at $a$ in Fig. 7, instead of a circular shape. Also here the turning of the iron return path body will cause a variation of the field and thus also of the torque. When there are more than two poles of the magnet, the iron return path body must be accordingly made, and have a corresponding number of recesses or undulations if of a disk shape, so as to afford a corresponding number of parts which are close, and others which are distant from the magnet system.

In eddy-current tachometers, the effective pole surfaces of the magnets of which have neither a cylindrical nor a plane shape, but are of a conical form, the adjustment may be arranged in a correspondingly modified manner. Then also the effect of the iron return path body, which, in the one instance is obtained by a special configuration, and in the other instance by a special position relatively to the body of the magnet, may be combined, whereby it may be possible to obtain an increased effect.

I claim:

1. An eddy current tachometer having, in combination with a rotary magnet and an indicator body, an iron return path body revoluble with the magnet, said iron body being also rotatable about the axis of the magnet and relative to the latter, to vary the mass of said iron body included in the field transsecting the indicator body.

2. An eddy current tachometer, comprising in combination with a magnet-system, an iron return path body revolving together with the magnet system, the said iron return path body adapted to be turned around the axis of the magnet system and of such a shape, that when thus turned, the mass of iron it opposes to the poles of the magnet system is increased or reduced respectively, without any axial displacement of said iron return path body.

3. An eddy-current tachometer, comprising in combination with a magnet-system, an iron return path body revolving together with the magnet system, the said iron return path body adapted to be turned around the axis of the magnet system and forming with the said magnet system a ring-shaped gap, the wall of said iron return path body being of a varying height.

4. An eddy-current tachometer, comprising in combination with a magnet-system, an iron return path body revolving together with the magnet system, the said iron return path body being seated in a guide groove formed on said magnet-system and adapted to be turned around the axis of the latter to thereby vary the field transsecting the indicator body without any axial displacement of said iron return path body, and means provided for fixing said iron return path body in said groove.

5. An eddy-current tachometer, comprising in combination with a magnet system, an iron return path body revoluble together with the magnet system, said iron body being seated in a guide groove and adapted to be turned around the axis of the magnet system to thereby vary the field transsecting the indicator body without axial displacement of said iron body, and means provided for fixing said iron body in its guide groove, said means consisting of an elastic strap and a screw for tightening said strap against said body.

6. An eddy current tachometer having, in combination with a rotary magnet and an indicator body, an iron return path body rotatable with said magnet, said iron body being also rotatable relative to said magnet, and the mass of said iron body varying at points around said magnet to permit the positioning of portions of varying area opposite the poles of said magnet.

In testimony whereof I have affixed my signature in presence of two witnesses.

WILHELM BECKMANN.

Witnesses:
HENRY HASPER,
WOLDEMAR HAUPT.

Copies of this patent may be obtained for five cents each, by addressing the "Commissioner of Patents, Washington, D. C."